United States Patent [19]
Caccavale et al.

[11] 3,961,091
[45] June 1, 1976

[54] PROCESS FOR PRODUCING FLAVORED POPCORN

[76] Inventors: John L. Caccavale, 1812 Baxter St.; Victor J. Pierce, 2040 Vestal Ave., both of Los Angeles, Calif. 90026; Robert W. Young, 10 Gracie Square, New York, N.Y. 10028; Samuel B. Prussin, 2126 Banyan Drive, Los Angeles, Calif. 90049

[22] Filed: May 1, 1974

[21] Appl. No.: 465,842

Related U.S. Application Data

[63] Continuation-in-part of Ser. No. 369,516, June 13, 1973.

[52] U.S. Cl. .............................. 426/307; 426/309; 426/93
[51] Int. Cl.² ........................................... A23L 1/18
[58] Field of Search ............ 426/289, 296, 302, 89, 426/93, 96, 103, 351, 98, 99, 113, 307, 309

[56] References Cited
UNITED STATES PATENTS

| | | | |
|---|---|---|---|
| 2,240,759 | 5/1941 | Chandler | 426/99 |
| 3,495,988 | 2/1970 | Balassa | 426/98 X |
| 3,519,439 | 7/1970 | Dunn | 426/111 |
| 3,582,336 | 6/1971 | Rasmusson | 426/309 |
| 3,582,361 | 6/1971 | Huth | 426/195 X |
| 3,704,133 | 11/1972 | Kracauer | 426/103 X |

*Primary Examiner*—Raymond N. Jones

[57] ABSTRACT

Flavored popcorn is produced by preparing a composition of popcorn kernels, a cooking oil medium and encapsulated flavoring substances which can be introduced into a cooking vessel.

4 Claims, No Drawings

PROCESS FOR PRODUCING FLAVORED POPCORN

This application is a continuation-in-part of application Ser. No. 369,516 filed June 13, 1973.

The invention disclosed in application Ser. No. 369,516 relates generally to the preparation of popped corn or popcorn as it is commonly called and more specifically to the preparation of flavored popped corn. According to that invention, it is possible to flavor popcorn at the same time it is being popped, in contrast to prior art methods in which flavors were applied by spraying, pouring and/or mixing after the popping step. A feature of the invention is the utilization of encapsulated flavoring substances which are found to inpart a variety of selected flavors uniformly to the popped corn.

According to the improved invention it has now been found that good results can be obtained by utilizing a quantity of lecithin in certain ranges during the popping step.

The principle object of the invention is the provision of a flavored popcorn which can be prepared either commercially or in the home.

Another object of the invention is the provision of a flavored popcorn product which will have uniform flavoring.

Another object of the invention is the provision of a method and composition which can be used in the home and result in an acceptable snack food which can be prepared by ordinary popcorn making methods in standard corn popping devices.

BACKGROUND OF THE INVENTION

Flavored popcorn per se is not new and such flavored popcorn products as "Craker Jack" brand flavored popcorn, caramel coated popcorn, cheese coated popcorn and popcorn balls are well known. All of the usual prior art methods require a flavoring step after the popping step wherein a flavoring substance is sprayed or poured on the popcorn, usually followed by mixing in an attempt to evenly apply the flavor to the popcorn. This prior art methodology has proven disadvantageous to the extent that it requires a separate flavoring step which is inconvenient and sometimes difficult to carry out either commercially or in the home, and further, the resulting product is sometimes unsatisfactory due to inadequate distribution of the flavoring on the popcorn. These prior art problems have been solved by the one step popping and flavoring technique of the present invention.

A further disadvantage of the prior art methods, and concomitantly an advantage of the present invention, is the generally limited variety of flavors available in flavored popcorn for home preparation. Pursuant to this invention a relatively large variety of flavors are available including for example spice, herb, fruit, meat and dairy flavors for one step flavored popcorn preparation.

DETAILED DESCRIPTION OF THE INVENTION

According to the invention there is provided a method and a composition for producing flavored popcorn which comprise in a broad aspect the combining of popcorn kernels in a cooking medium together with a flavoring substance and lecithin following which the contents of the vessel are heated to pop the kernels while at the same time they are being flavored. In a preferred form of the invention the lecithin is evenly coated on the surface of the flavoring substance when such are combined with the cooking medium. A feature of the invention is the provision of a pre-mix having both the foregoing contemplated cooking medium, flavoring substance, and lecithin to which the popcorn kernels can be added in the cooking vessel. A further feature of the invention is the provision of a concentrated pre-mix where less than all the cooking medium used to pop the kernels is mixed with the flavoring substance following which an additional amount of cooking medium necessary to pop the corn kernels is introduced into the vessel. It is contemplated in a commercial context that the flavoring substances, pre-mix, or concentrated premix, depending upon the circumstances, may be sold to the consumer either separately, or with separately packaged popcorn kernels. A presently preferred package includes flavoring substance with its surface coated with lecithin and includes separately packaged popcorn with instructions that the consumer provide and add the necessary cooking medium.

The cooking medium is preferably an oil or semi-solid or solid fat suitable for cooking purposes and particularly suitable for popping corn kernels. Examples of such oils or fats are soybean oil, cottonseed oil, safflower oil, corn oil, peanut oil, hydrogenated or partially hydrogenated vegetable oil, butter and the like.

In a preferred form of the invention the flavoring substances are in the form of liquids encapsulated in a suitable encapsulating medium. It has been found according to the invention that practically any liquid flavor capable of being encapsulated can be used. Presently preferred encapsulating media are acacia, starch and/or dextrins or other hydrocolloids and methyl cellulose.

It is thought that the encapsulated flavors produce particular advantages in the flavoring of popcorn in the present invention because the encapsulating medium inhibits the flavor from being extracted and subjected to volatilization, fractionation, decomposition and the otherwise destructive temperatures of popping particularly from steam distillation which occurs when the pressure from superheated steam generated in the kernel exceeds the cohesive strength of the kernel shell material.

In a typical encapsulating process according to the invention the encapsulating medium is supplied as a gum which is dissolved in water. The flavoring substance is then added and suspended in the gum solution. In forming the encapsulated flavoring substance the gum solution is sprayed into a drying tower and the water driven off by a counter-current stream of dry air. It has been found that ratios of gum to flavoring substance in the range from and including 90 to 10 to and including 60 to 40 parts by weight produce the best results.

Among the advantages of the present invention are the uniform distribution of flavoring. This is thought to be due to several factors present in the one step popping and flavoring process of the invention which causes intimate contact of popped and unpopped corn with the flavoring substances in their encapsulated form. The unpopped kernel is first soaked in the popping medium containing the encapsulated flavor which is further brought into contact with the expanding corn during the popping process. Because of its high surface area popped corn will adsorb the encapsulated flavor as well as absorb such when the popped corn cools and partial vacuums are created in the interstices thereof.

According to the invention in its improved form it is desirable to include an amount of lecithin in the cookng medium during the popping step. It is preferred that the lecithin be evenly coated on the surface of the flavoring substance when such are combined with the cooking medium. The lecithin helps maintain the dry flavoring substance in its particulate form preventing or minimizing agglomeration when they are dispersed in the oil cooking medium. The popcorn also helps promote dispersion of the flavor ingredients by agitation as a result of the high velocity movement of the popping kernels.

It has been found that the amount of lecithin to give good results is dependent in part upon the weight of popcorn kernels present in the cooking medium. The water present in the corn kernels forms a lecithin stabilized emulsion with the oil which might normally be expected to foam excessively as the water and oil boil to form a stable froth which would deleteriously impede the movement of kernels in the cooking medium as noted. It has been determined according to the invention that an amount of lecithin below that which will cause foaming is nevertheless satisfactory to prevent agglomeration or "clunping" of the flavoring substance. Presently preferred numerical ranges of the lecithin, based on weight percent of popcorn kernels are about 0.01 to about 0.5 percent with the particularly preferred range being about 0.02 to about 0.2 percent.

SPECIFIC EXAMPLES

The following Specific Examples illustrate the effectiveness of the invention.

EXAMPLE I

The following ingredients were introduced into a cooking vessel with 2.3 ozs. corn oil and heated to popping temperature.

| | |
|---|---|
| Givaudan Corp. Permaseal Imitation Bacon Flavor F6256 | 8.04 grams |
| Salt | 5.00 grams |
| Monosodium Glutamate | 0.2 grams |
| Lecithin | 0.26 grams |
| Popcorn | 86.50 grams |

The lecithin was distributed uniformly over a mixture of the first three ingredients by means of suitable processing equipment, e.g. malanger of oscillator.

Heating to popping temperature produced a moderately stable foam in the corn oil with incomplete popping due to the presence of an insulating froth or foam.

EXAMPLE II

The following ingredients were mixed and popped in the same manner as in Example I.

| | |
|---|---|
| Givaudan Corp. Permaseal Imitation Bacon Flavor F6256 | 8.00 grams |
| Salt | 5.00 grams |
| Monosodium Glutamate | 0.19 grams |
| Lecithin | 0.01 grams |
| Popcorn | 86.80 grams |

Popping resulted in only fair flavor dispesion considered unacceptable for a commercial product. No froth was developed.

EXAMPLE III

The following ingredients were mixed and popped in the manner of the preceeding Examples.

| | |
|---|---|
| Givaudan Corp. Permaseal Imitation Bacon Flavor F6256 | 8.00 grams |
| Salt | 5.00 grams |
| Monosodium Glutamate | 0.20 grams |
| Lecithin | 0.05 grams |
| Popcorn | 86.75 grams |

Upon popping the dispersion of the flavoring was observed to be excellent. There was a slight foam at the time of popping, but it was observed to break as fast as it was formed.

A comparison of the Examples will indicate the advantages of using Lecithin in the cooking medium.

EXAMPLE IV

The following ingredients were popped in the manner of the preceeding Examples.

| | |
|---|---|
| Givaudan Corp. Permaseal Imitation Bacon Flavor F6256 | 8.00 grams |
| Salt | 5.00 grams |
| Monosodium Glutamate | 0.20 grams |
| Popcorn | 86.80 grams |

The resulting popped corn failed to have adequate flavor dispersion as indicated by flavor intensity variance between individual pieces of popcorn.

We claim:
1. The method of producing flavored popcorn consisting essentially of:
   a. combining popcorn kernels, a cooking medium for said popcorn kernels selected from the group consisting of oils, semi-solid fats or solid fats, encapsulated flavoring substances in particulate form and lecithin in an amount sufficient to disperse and prevent agglomeration or clumping of the flavoring substances, but below an amount which will produce excessive foaming and introducing same into a cooking vessel; and,
   b. heating said combined materials for a period of time sufficient to pop said popcorn kernels.
2. The method according to claim 1 wherein said encapsulated flavoring substance and lecithin are first combined to form a lecithin coated flavoring substance and said coated flavoring substance is combined with said popcorn kernels and cooking medium.
3. The method according to claim 1 wherein lecithin is present in the range of about 0.01 to about 0.5% of the weight of the popcorn kernels.
4. The method according to claim 3 wherein said range is about 0.02 to about 0.2%.

* * * * *